United States Patent
Wang et al.

(10) Patent No.: US 10,127,431 B2
(45) Date of Patent: Nov. 13, 2018

(54) FINGERPRINT IDENTIFICATION ELEMENT, FINGERPRINT IDENTIFICATION METHOD, DISPLAY DEVICE AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Lei Wang, Beijing (CN); Yingming Liu, Beijing (CN); Xiaochuan Chen, Beijing (CN); Haisheng Wang, Beijing (CN); Shengji Yang, Beijing (CN); Pengcheng Lu, Beijing (CN); Wei Liu, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/533,895

(22) PCT Filed: Jan. 25, 2016

(86) PCT No.: PCT/CN2016/072015
§ 371 (c)(1),
(2) Date: Jun. 7, 2017

(87) PCT Pub. No.: WO2017/036079
PCT Pub. Date: Mar. 9, 2017

(65) Prior Publication Data
US 2017/0337418 A1    Nov. 23, 2017

(30) Foreign Application Priority Data

Aug. 28, 2015 (CN) .......................... 2015 1 0543535

(51) Int. Cl.
*G06K 9/00* (2006.01)

(52) U.S. Cl.
CPC ..... *G06K 9/00087* (2013.01); *G06K 9/00013* (2013.01)

(58) Field of Classification Search
CPC .................. G06K 9/00087; G06K 9/00013
See application file for complete search history.

(56) References Cited

U.S. PATENT DOCUMENTS

| 6,401,551 B1 | 6/2002 | Kawahara et al. |
| 2004/0213440 A1* | 10/2004 | Joo ............ G06K 9/0002 382/124 |

(Continued)

FOREIGN PATENT DOCUMENTS

| CN | 1283833 A | 2/2001 |
| CN | 101526988 A | 9/2009 |

(Continued)

OTHER PUBLICATIONS

International Search Report and Written Opinion dated May 26, 2016; PCT/CN2016/072015.

*Primary Examiner* — Ruiping Li
(74) *Attorney, Agent, or Firm* — Ladas & Parry LLP

(57) ABSTRACT

A fingerprint identification element, a fingerprint identification method, a display device and a display apparatus are provided. The fingerprint identification element includes fingerprint identification units arranged in matrix, fingerprint identification scan lines and fingerprint identification read lines. Each fingerprint identification unit includes a first photosensitive thin film transistor and a second switching thin film transistor. A gate electrode and a source electrode (Continued)

of the first thin film transistor are connected with each other. A drain electrode of the first thin film transistor is electrically connected with a drain electrode of the second thin film transistor. Gate electrodes of the second thin film transistors in each row of the fingerprint identification units are electrically connected with the corresponding fingerprint identification scan line. Source electrodes of the second thin film transistors in each column of the fingerprint identification units are electrically connected with the corresponding fingerprint identification read line.

18 Claims, 5 Drawing Sheets

(56) References Cited

U.S. PATENT DOCUMENTS

| 2008/0007507 | A1* | 1/2008 | Kim | G02F 1/13338 |
| | | | | 345/92 |
| 2010/0321356 | A1* | 12/2010 | Brown | H01L 27/14643 |
| | | | | 345/207 |
| 2014/0282059 | A1 | 9/2014 | Oh et al. | |
| 2016/0349882 | A1 | 12/2016 | Liu et al. | |

FOREIGN PATENT DOCUMENTS

| CN | 104850292 A2 | 8/2015 |
| CN | 105184247 A | 12/2015 |
| CN | 102830857 B | 1/2016 |

\* cited by examiner

FINGERPRINT IDENTIFICATION ELEMENT, FINGERPRINT IDENTIFICATION METHOD, DISPLAY DEVICE AND DISPLAY APPARATUS

TECHNICAL FIELD

Embodiments of the present disclosure relate to a fingerprint identification element, a fingerprint identification method, a display device and a display apparatus.

BACKGROUND

A fingerprint is an invariant feature of a human body, which is inborn and unique and is distinguished from other people. The fingerprint consists of a series of ridges and valleys on the skin surface of a finger end. Details of the ridges and the valleys generally include details of branches of the ridges, tail ends of the ridges, arches, tent-type arches, left spirals, right spirals, spirals or double spirals and the like, and these details decide uniqueness of a fingerprint pattern. A fingerprint identification element is generally used for personal identity authentication early; and currently, a photosensitive fingerprint identification element and a capacitive fingerprint identification element are widely applied and are well known.

In the photosensitive fingerprint identification element, generally there are provided a plurality of photosensitive thin film transistors and a plurality of signal lines respectively corresponding to the photosensitive thin film transistors and electrically connected with the photosensitive thin film transistors, and each photosensitive thin film transistor is electrically connected with a fingerprint identification chip by its corresponding signal line. In the case that a finger is positioned above the fingerprint identification element, intensity of light reflected to the photosensitive thin film transistors from the valleys of the finger is different from that of light reflected to the photosensitive thin film transistors from the ridges of the finger, so that light currents generated by the photosensitive thin film transistors are different in magnitude, and the fingerprint identification chip obtains the fingerprint pattern of the finger by detecting the light currents transmitted by the signal lines corresponding to the photosensitive thin film transistors.

In the fingerprint identification element, the valleys and the ridges of the finger need to be distinguished, and thus, a great number of photosensitive thin film transistors and a great number of signal lines connected with the photosensitive thin film transistors need to be arranged, resulting in a relatively complex structure of the fingerprint identification element.

SUMMARY

According to embodiments of the disclosure, a fingerprint identification element is provided. The fingerprint identification element comprises a plurality of fingerprint identification units arranged in matrix, a plurality of fingerprint identification scan lines, and a plurality of fingerprint identification read lines, each of the plurality of fingerprint identification scan lines corresponds to and electrically connected with one row of the fingerprint identification units, each of the plurality of fingerprint identification read lines corresponds to and electrically connected with one column of the fingerprint identification units, the plurality of fingerprint identification scan lines are insulated from the plurality of fingerprint identification read lines. Each fingerprint identification unit includes: a first thin film transistor and a second thin film transistor, the first thin film transistor is a photosensitive thin film transistor, and the second thin film transistor is a switching thin film transistor; a gate electrode and a source electrode of the first thin film transistor in each fingerprint identification unit are connected with each other and are applied with a preset voltage, and a drain electrode of the first thin film transistor is electrically connected with a drain electrode of the second thin film transistor in each fingerprint identification unit; and gate electrodes of the second thin film transistors in each row of the fingerprint identification units are electrically connected with the corresponding fingerprint identification scan line, and source electrodes of the second thin film transistors in each column of the fingerprint identification units are electrically connected with the corresponding fingerprint identification read line.

For example, the first thin film transistor and the second thin film transistor in each fingerprint identification unit are arranged in a stacking manner; the fingerprint identification element further comprises a first insulating layer positioned between a layer in which the first thin film transistor is positioned and a layer in which the second thin film transistor is positioned; and the gate electrode of the first thin film transistor in each fingerprint identification unit is positioned between an active layer of the first thin film transistor and the first insulating layer.

For example, an active layer of the second thin film transistor in each fingerprint identification unit is positioned between a gate electrode of the second thin film transistor and the first insulating layer.

For example, a gate electrode of the second thin film transistor in each fingerprint identification unit is positioned between an active layer of the second thin film transistor and the first insulating layer.

According to the embodiments of the disclosure, a fingerprint identification method adopting the fingerprint identification element as described above is provided. The method comprises: sequentially applying a scanning signal to the fingerprint identification scan lines, applying a preset voltage into the gate electrode and the source electrode of each first thin film transistor in the fingerprint identification units corresponding to each fingerprint identification scan line in the process of applying the scanning signal to each fingerprint identification scan line, and detecting a light current generated by each first thin film transistor and transmitted on each fingerprint identification read line; determining a fingerprint pattern according to the detected light current; comparing the determined fingerprint pattern with a pre-stored fingerprint information to determine whether the fingerprint pattern is the same with the pre-stored fingerprint information; and determining that a touch occurs in the case that it is determined that the fingerprint pattern is the same with the pre-stored fingerprint information.

According to the embodiments of the disclosure, a display device comprising the fingerprint identification element as described above is provided.

For example, the display device further comprises a plurality of pixel units arranged in matrix. Each pixel unit includes a plurality of sub pixel units of different colors, and in one column of the sub pixel units in each column of the pixel units, one fingerprint identification unit is arranged in each sub pixel unit.

For example, the column of the sub pixel units arranged between two adjacent columns of the fingerprint identification units has a same number.

For example, the color of the sub pixel unit corresponding to each fingerprint identification unit is blue.

For example, each sub pixel unit includes a pixel electrode and a third thin film transistor; and the first thin film transistor and the second thin film transistor in each fingerprint identification unit and the third thin film transistor in the sub pixel unit corresponding to each fingerprint identification unit are arranged in a stacking manner.

For example, the third thin film transistor is positioned on a side of the second thin film transistor facing away from the first insulating layer, or the third thin film transistor is positioned between a layer in which the second thin film transistor is positioned and the first insulating layer, and the display device further comprises: a second insulating layer positioned between a layer in which the third thin film transistor is positioned and the layer in which the second thin film transistor is positioned.

For example, a plurality of adjacent fingerprint identification units are configured as one touch unit.

According to the embodiments of the disclosure, a display apparatus comprising the display device as described above is provided.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
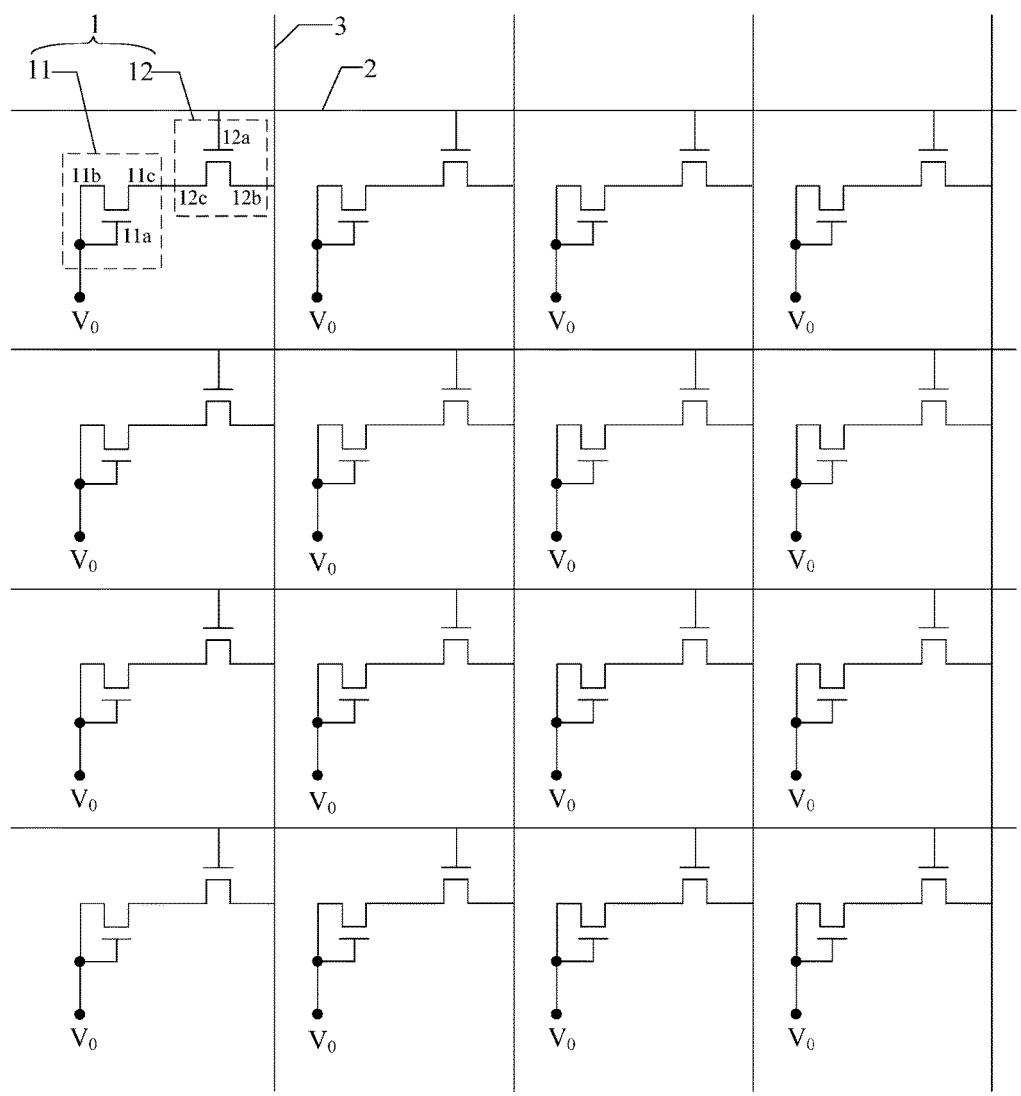
FIG. 1 is a structural schematic view illustrating a fingerprint identification element provided by embodiments of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

A shape and a thickness of each layer in the drawings do not reflect the true scale of the layer, and only aim to schematically illustrate contents of embodiments of the present disclosure.

Embodiments of the present disclosure provide a fingerprint identification element, as shown in FIG. 1, including: a plurality of fingerprint identification units 1 arranged in matrix (FIG. 1 shows 4 rows and 4 columns of the fingerprint identification units for example); a plurality of fingerprint identification scan lines 2, each of the plurality of fingerprint identification scan lines 2 corresponding to and electrically connected with one row of the fingerprint identification units 1; and a plurality of fingerprint identification read lines 3, each of the plurality of fingerprint identification read lines 3 corresponding to and electrically connected with one column of the fingerprint identification units 1. The plurality of fingerprint identification scan lines 2 are insulated from the plurality of fingerprint identification read lines 3.

For example, each fingerprint identification unit 1 includes: a first thin film transistor 11 and a second thin film transistor 12; the first thin film transistor 11 is a photosensitive thin film transistor; the second thin film transistor 12 is a switching thin film transistor.

A gate electrode 11a and a source electrode 11b of the first thin film transistor 11 in each fingerprint identification unit 1 are connected with each other and are applied with a preset voltage $V_0$, and a drain electrode 11c of the first thin film transistor 11 is electrically connected with a drain electrode 12c of the second thin film transistor 12 in each fingerprint identification unit; and gate electrodes 12a of the second thin film transistors 12 in each row of the fingerprint identification units 1 are electrically connected with the corresponding fingerprint identification scan line 2, and source electrodes 12b of the second thin film transistors 12 in each column of the fingerprint identification units 1 are electrically connected with the corresponding fingerprint identification read line 3.

For example, the fingerprint identification scan lines 2 and the fingerprint identification read lines 3 intersect with each other.

According to the fingerprint identification element provided by the embodiments of the present disclosure, one second thin film transistor (the switching thin film transistor) is additionally arranged for each first thin film transistor (the photosensitive thin film transistor); a scanning signal is sequentially applied to the fingerprint identification scan lines, the second thin film transistors in the fingerprint identification units corresponding to each fingerprint identification scan line are controlled to be turned on, and light currents generated by the first thin film transistors in the fingerprint identification units corresponding to each fingerprint identification scan line are transmitted to the corresponding fingerprint identification read lines by the second thin film transistors in the fingerprint identification units; by detecting the light currents on the fingerprint identification read lines, a fingerprint pattern is identified. Compared with a structure of an existing fingerprint identification element which needs to arrange one signal line for each photosensitive thin film transistor, wirings of the fingerprint identification element according to the embodiments of the disclosure are greatly reduced, and the structure of the fingerprint identification element according to the embodiments of the disclosure is simplified. For example, as shown in FIG. 1, in the fingerprint identification element provided by the embodiments of the present disclosure, 8 signal lines (including four fingerprint identification scan lines and four fingerprint identification read lines) are arranged for 4 rows and 4 columns of the fingerprint identification units; however, in the existing fingerprint identification element, 4 rows and 4 columns of photosensitive thin film transistors are 16 photosensitive thin film transistors in total and one signal line needs to be arranged for each photosensitive thin film transistor, and thus, 16 signal lines need to be arranged in total.

It should be noted that in the fingerprint identification element provided by the embodiments of the present disclosure, the preset voltage is applied to the gate electrode and the source electrode of the first thin film transistor in each fingerprint identification unit, and the preset voltage for example is a direct current voltage, such as a common voltage; or, the preset voltage for example is a pulse voltage with a frequency consistent with the scanning signal, which is not limited herein. For example, in the case that the preset voltage is applied to the gate electrode and the source electrode of the first thin film transistor in the fingerprint identification unit, the first thin film transistor generates a preset light current under an illumination; in the case that a finger is positioned above the fingerprint identification element, intensity of light reflected to the first thin film transistor from valleys and ridges of the finger is changed, so that the light current generated by the first thin film transistor is changed; and variation of the intensity of the light reflected to the first thin film transistor from the valleys of the finger is different from variation of the intensity of the light reflected to the first thin film transistor from the ridges of the finger, and thus, by detecting the light current transmitted on each fingerprint identification read line, the fingerprint pattern is identified.

In the fingerprint identification element provided by the embodiments of the present disclosure, one second thin film transistor is additionally arranged for each first thin film transistor, and in the case that the fingerprint identification element provided by the embodiments of the present disclosure is applied to a display device, the second thin film transistors additionally arranged in the fingerprint identification element may influence an aperture ratio of the display device.

Figure 2A:
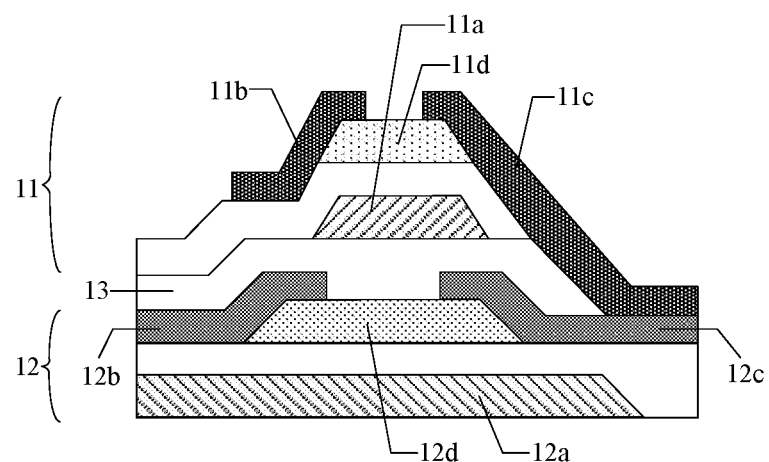
FIG. 2a and FIG. 2b respectively are structural schematic views illustrating a first thin film transistor and a second thin film transistor in the fingerprint identification element provided by the embodiments of the present disclosure.
Figure 2B:
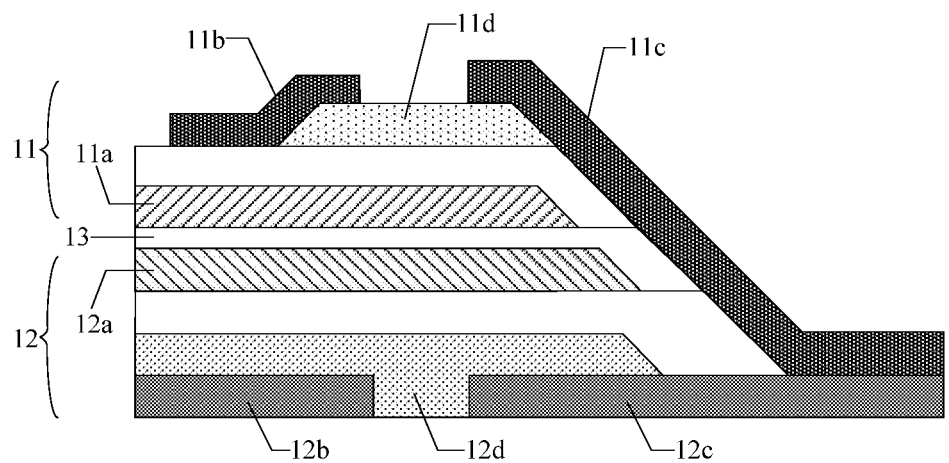

In order to solve this problem, in the fingerprint identification element provided by the embodiments of the present disclosure, as shown in FIG. 2a and FIG. 2b, the first thin film transistor 11 and the second thin film transistor 12 in each fingerprint identification unit are arranged in a stacking manner, so that influence of the fingerprint identification element on the aperture ratio of the display device is reduced in the case that the fingerprint identification element provided by the embodiments of the present disclosure is applied to the display device. For example, in order to avoid a problem of short circuit caused by undesired electrical connection of the first thin film transistor 11 and the second thin film transistor 12, as shown in FIG. 2a and FIG. 2b, the fingerprint identification element further includes: a first insulating layer 13 positioned between a layer in which the first thin film transistor 11 is positioned and a layer in which the second thin film transistor 12 is positioned. Moreover, in order to facilitate a channel region (i.e., a region in an active layer 11d and between the source electrode 11b and the drain electrode 11c) of the first thin film transistor 11 receiving the light reflected by the valleys and the ridges of the finger to generate the light current, the active layer 11d of the first thin film transistor 11 needs to be arranged on a side close to a position where the fingerprint identification element is touched by the finger, i.e., the gate electrode 11a of the first thin film transistor 11 in the fingerprint identification unit is positioned between the active layer 11d of the first thin film transistor and the first insulating layer 13, so that a case that the gate electrode 11a of the first thin film transistor 11 shields the channel region to influence a photosensitive property of the first thin film transistor 11 is avoided.

In the fingerprint identification element provided by the embodiments of the present disclosure, the second thin film transistor is configured as a switching transistor, and a channel region of the second thin film transistor does not need to receive the light reflected by the valleys and the ridges of the finger; and thus, as shown in FIG. 2a, an active layer 12d of the second thin film transistor 12 in the fingerprint identification unit is arranged between the gate electrode 12a of the second thin film transistor and the first insulating layer 13, or, as shown in FIG. 2b, the gate electrode 12a of the second thin film transistor 12 in the fingerprint identification unit is arranged between the active layer 12d of the second thin film transistor and the first insulating layer 13, which are not limited here.

Figure 3:
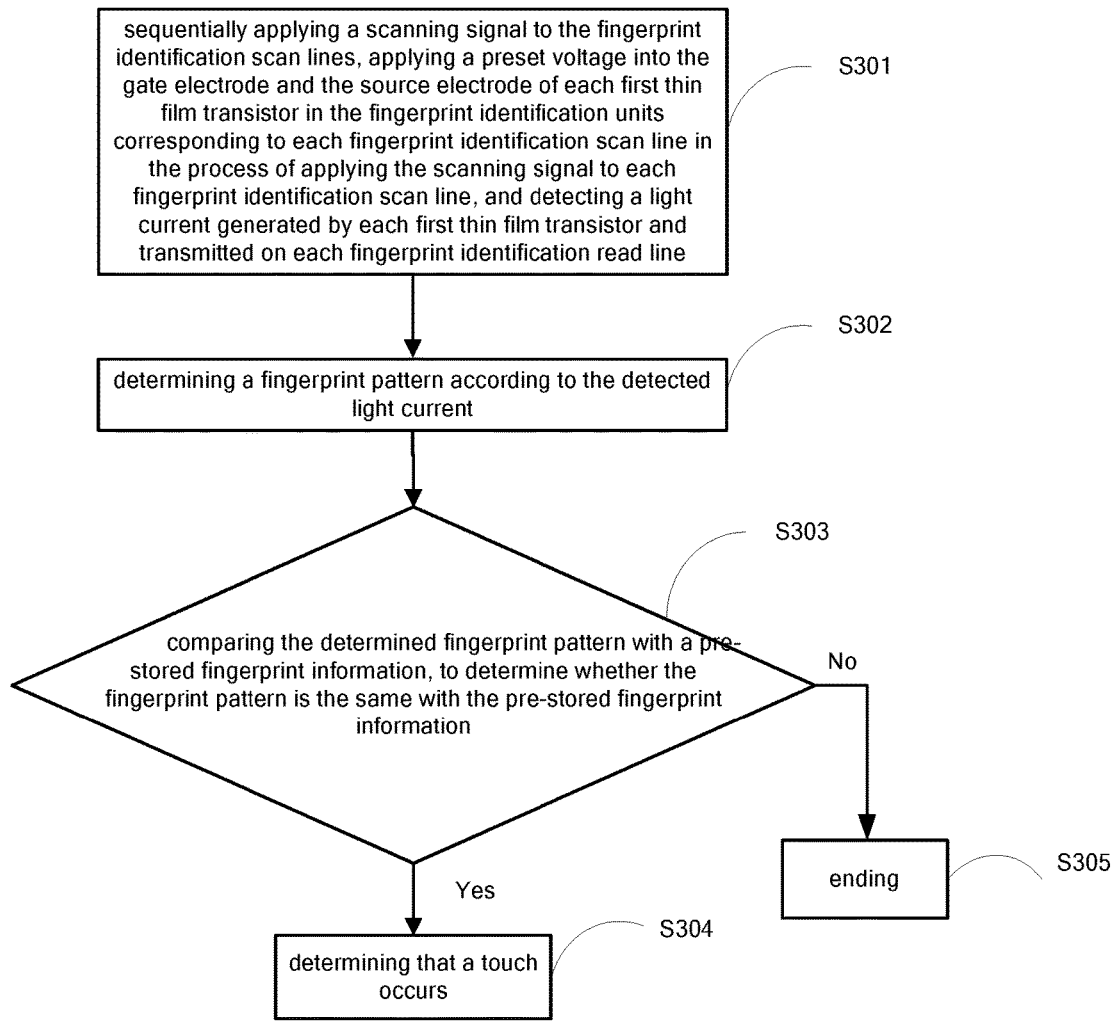
FIG. 3 is a flow chart of a fingerprint identification method provided by the embodiments of the present disclosure.

For the fingerprint identification element provided by the embodiments of the present disclosure, the embodiments of the present disclosure further provide a fingerprint identification method, as shown in FIG. 3, including steps of:

S301: sequentially applying a scanning signal to the fingerprint identification scan lines, applying a preset voltage into the gate electrode and the source electrode of each first thin film transistor in the fingerprint identification units corresponding to each fingerprint identification scan line in the process of applying the scanning signal to each fingerprint identification scan line, and detecting a light current generated by each first thin film transistor and transmitted on each fingerprint identification read line;

S302: determining a fingerprint pattern according to the detected light current;

S303: comparing the determined fingerprint pattern with a pre-stored fingerprint information, to determine whether the fingerprint pattern is the same with the pre-stored fingerprint information; if yes, executing step S304; if no, executing step S305;

S304: determining that a touch occurs;

S305: ending.

Specific implementation of the identification method provided by the embodiments of the present disclosure can refer to the embodiments of the fingerprint identification element, and is not repeated herein.

The embodiments of the present disclosure further provide a display device, including: the fingerprint identification element provided by the embodiments of the present disclosure. Implementation of the display device can refer to the embodiments of the fingerprint identification element, and is not repeated herein.

Figure 4:
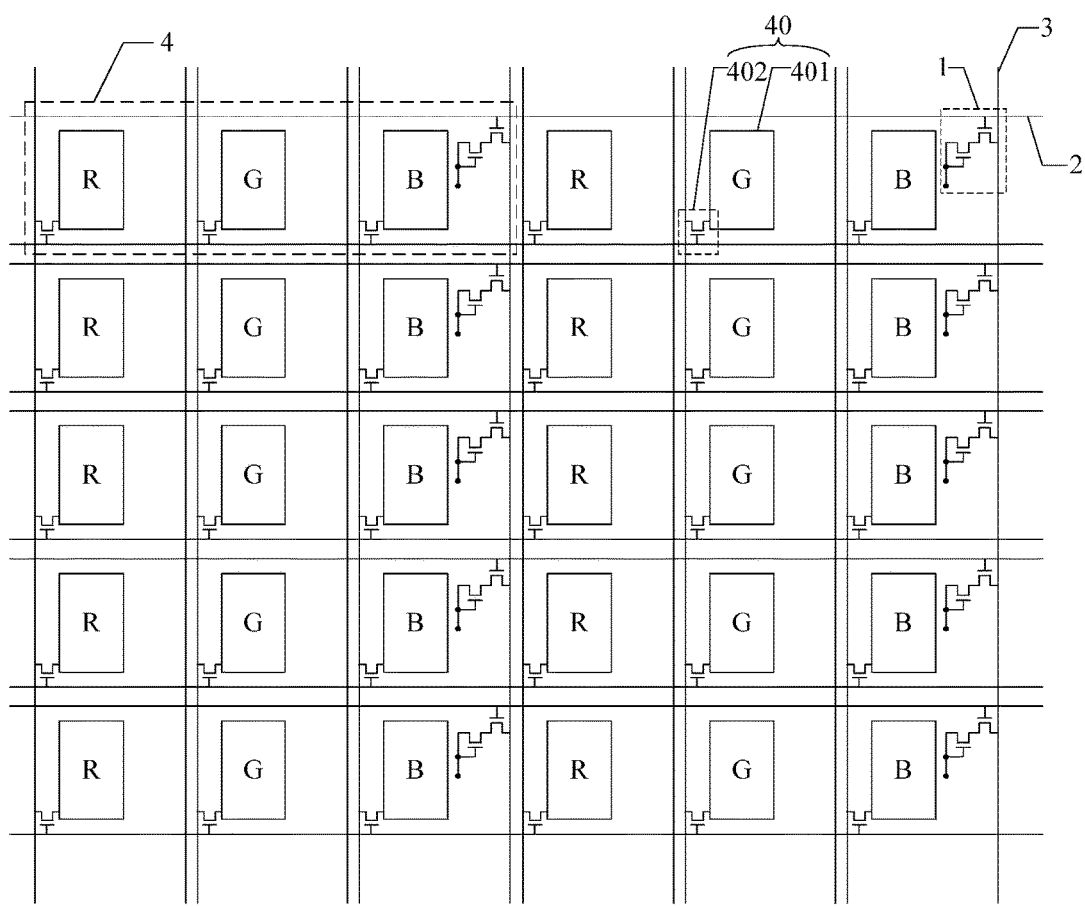
FIG. 4 a structural schematic view illustrating a display device provided by the embodiments of the present disclosure.

The display device provided by the embodiments of the present disclosure, as shown in FIG. 4, for example further includes: a plurality of pixel units 4 arranged in matrix; and each pixel unit 4 includes a plurality of sub pixel units 40 of different colors. For example, as shown in FIG. 4, each pixel unit 4 includes three sub pixel units 40 of red (R), green (G) and blue (B). For example, in one column of the sub pixel units 40 in each column of the pixel units 4, one fingerprint identification unit 1 is arranged in each sub pixel unit 40 so as to ensure that one fingerprint identification unit 1 is correspondingly arranged for each pixel unit 4, thereby improving sensitivity of fingerprint identification of the display device. A density of the fingerprint identification unit for example is set according to accuracy of fingerprint identification, and for example, one fingerprint identification unit is arranged to correspond to each sub pixel unit, or one fingerprint identification unit is arranged to correspond to a plurality of pixel units, which are not limited herein.

Further, for example, in the display device provided by the embodiments of the present disclosure, the column of the sub pixel units arranged between two adjacent columns of the fingerprint identification units has a same number, and for example, as shown in FIG. 4, in a third column of the sub pixel units 40 in each column of the pixel units 4, one fingerprint identification unit 1 is arranged in each sub pixel unit 40, i.e., two columns of sub pixel units 40 are arranged between two adjacent columns of the fingerprint identification units, so that accuracy of fingerprint identification of the display device can be unified; or, the column of the sub pixel units arranged between two adjacent columns of the fingerprint identification units have a different number, which are not limited herein.

For example, in the display device provided by the embodiments of the present disclosure, as shown in FIG. 4, the color of the sub pixel unit 40 corresponding to each fingerprint identification unit 1 is blue (B), which is due to a case that with respect to red (R) and green (G), blue (B) is relatively insensitive for human eyes, and thus, in the case that the fingerprint identification unit is arranged in the sub pixel unit of blue, a visual effect of an image displayed by the display device is not influenced.

Figure 5:
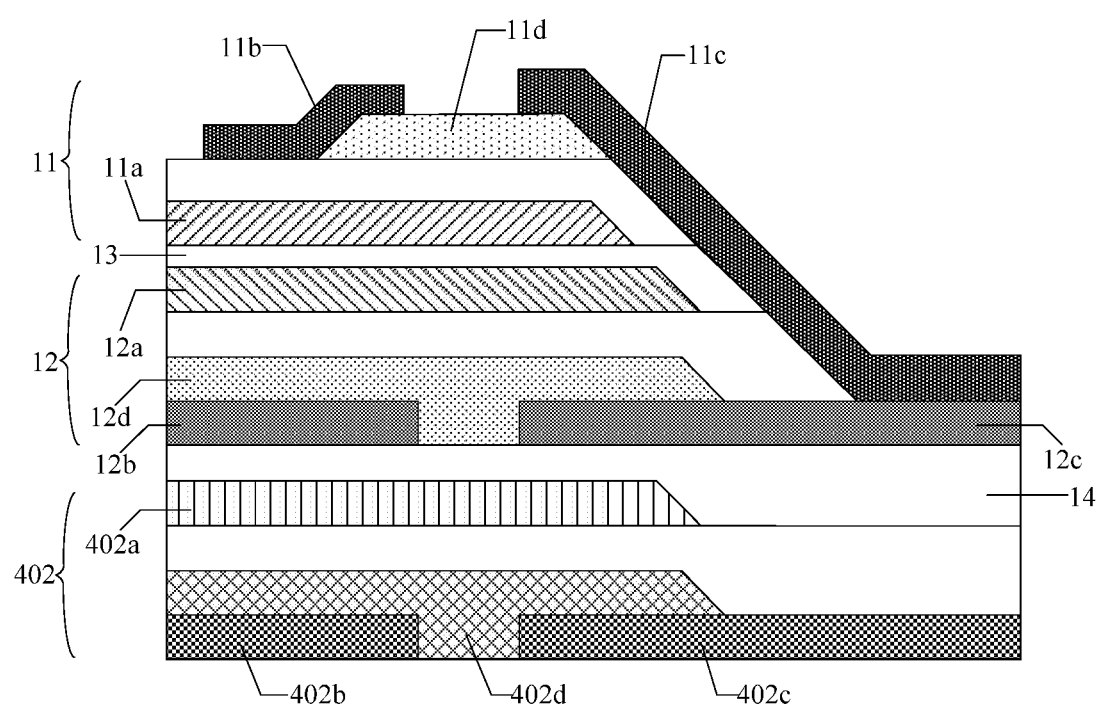
FIG. 5 is a structural schematic view illustrating a first thin film transistor, a second thin film transistor and a third thin film transistor in the display device provided by the embodiments of the present disclosure.

For example, in the display device provided by the embodiments of the present disclosure, as shown in FIG. 4, each sub pixel unit 40 includes a pixel electrode 401 and a third thin film transistor 402; and as shown in FIG. 5, the first thin film transistor 11 and the second thin film transistor 12 in each fingerprint identification unit are arranged in a stacking manner, and further the first thin film transistor 11 and the second thin film transistor 12 in each fingerprint identification unit and the third thin film transistor 402 in the sub pixel unit corresponding to each fingerprint identification unit are arranged in a stacking manner. In this way, influence of the fingerprint identification element on the aperture ratio of the display device is further reduced, and correspondingly, the aperture ratio of the display device is improved.

It should be noted that in the display device provided by the embodiments of the present disclosure, as shown in FIG. 5, a gate electrode 402a of the third thin film transistor 402 is positioned above an active layer 402d, i.e., the third thin film transistor 402 is of a top-gate type structure, and a source electrode 402b and a drain electrode 402c of the third thin film transistor 402 are positioned below the active layer 402d; or, the active layer of the third thin film transistor is positioned above the gate electrode, i.e., the third thin film transistor is of a bottom-gate type structure, which are not limited herein.

For example, in the display device provided by the embodiments of the present disclosure, as shown in FIG. 5, the third thin film transistor 402 is positioned on a side of the second thin film transistor 12 facing away from the first insulating layer 13; or, the third thin film transistor is positioned between the layer in which the second thin film transistor is positioned and the first insulating layer 13, which are not limited herein. For example, in order to avoid a problem of short circuit caused by electrical connection of the third thin film transistor and the second thin film transistor, as shown in FIG. 5, the display device for example further includes: a second insulating layer 14 positioned between the layer in which the third thin film transistor 402 is positioned and the layer in which the second thin film transistor 12 is positioned.

Generally, a touch accuracy is about 5 mm and an accuracy of fingerprint identification is about 50 μm, and thus, in the display device provided by the embodiments of the present disclosure, a plurality of adjacent fingerprint identification units for example are configured as one touch unit, so that the display device with the fingerprint identification element further achieves a touch function. For example, in a touch period, the scanning signal is applied to the plurality of fingerprint identification scan lines corresponding to each touch unit, the preset voltage is input to the gate electrode and the source electrode of the first thin film transistors in each touch unit, and the light current transmitted on each fingerprint identification read line and generated by each first thin film transistor in each touch unit is detected.

The embodiments of the present disclosure further provide a display apparatus, including: the display device provided by the embodiments of the present disclosure. The display apparatus for example is any product or part with a display function, e.g., a mobile phone, a tablet computer, a television, a display, a notebook computer, a digital photo frame, a navigator and the like. Implementation of the display apparatus can refer to the embodiments of the display device, and is not repeated herein.

The present disclosure discloses a fingerprint identification element, a fingerprint identification method, a display device and a display apparatus. The fingerprint identification element includes: the plurality of fingerprint identification units arranged in matrix; the plurality of fingerprint identification scan lines, each of the plurality of fingerprint identification scan lines corresponding to and electrically connected with one row of the fingerprint identification units; and a plurality of fingerprint identification read lines, each of the plurality of fingerprint identification read lines corresponding to and electrically connected with one column of the fingerprint identification units. Each fingerprint identification unit includes the first thin film transistor with a photosensitive effect and the second thin film transistor with a switching effect. The scanning signal is sequentially applied to the fingerprint identification scan lines, the second thin film transistors in the fingerprint identification units corresponding to each fingerprint identification scan line are controlled to be turned on, and light currents generated by the first thin film transistors in the fingerprint identification units corresponding to each fingerprint identification scan line are transmitted to the corresponding fingerprint identification read lines by the second thin film transistors in the fingerprint identification units; by detecting the light currents on the fingerprint identification read lines, the fingerprint pattern is identified. In this way, it is not needed to provide one signal line for each first thin film transistor, so that wirings of the fingerprint identification element are reduced, and the structure of the fingerprint identification element is simplified.

The foregoing embodiments merely are exemplary embodiments of the disclosure, and not intended to define the scope of the disclosure, and the scope of the disclosure is determined by the appended claims.

The present application claims priority of the Chinese Patent Application No. 201510543535.8 filed on Aug. 28, 2015, the disclosure of which are incorporated herein by its reference in its entirety as part of the present application.

The invention claimed is:

1. A fingerprint identification element, comprising: a plurality of fingerprint identification units arranged in matrix, a plurality of fingerprint identification scan lines, and a plurality of fingerprint identification read lines, each of the plurality of fingerprint identification scan lines corresponding to and electrically connected with one row of the fingerprint identification units, each of the plurality of fingerprint identification read lines corresponding to and electrically connected with one column of the fingerprint identification units, the plurality of fingerprint identification scan lines being insulated from the plurality of fingerprint identification read lines, wherein, each fingerprint identification unit comprises: a first thin film transistor and a second thin film transistor, the first thin film transistor is a photosensitive thin film transistor, and the second thin film transistor is a switching thin film transistor;

a gate electrode and a source electrode of the first thin film transistor in each fingerprint identification unit are connected with each other, and a drain electrode of the first thin film transistor is electrically connected with a drain electrode of the second thin film transistor in each fingerprint identification unit; and gate electrodes of the second thin film transistors in each row of the fingerprint identification units are electrically connected with the corresponding fingerprint identification scan line, and source electrodes of the second thin film transistors in each column of the fingerprint identification units are electrically connected with the corresponding fingerprint identification read line.

2. The fingerprint identification element according to claim 1, wherein, the first thin film transistor and the second thin film transistor in each fingerprint identification unit are arranged in a stacking manner;

the fingerprint identification element further comprises a first insulating layer positioned between a layer in which the first thin film transistor is positioned and a layer in which the second thin film transistor is positioned; and the gate electrode of the first thin film transistor in each fingerprint identification unit is positioned between an active layer of the first thin film transistor and the first insulating layer.

3. The fingerprint identification element according to claim 2, wherein, an active layer of the second thin film transistor in each fingerprint identification unit is positioned between a gate electrode of the second thin film transistor and the first insulating layer.

4. The fingerprint identification element according to claim 2, wherein, a gate electrode of the second thin film transistor in each fingerprint identification unit is positioned between an active layer of the second thin film transistor and the first insulating layer.

5. A fingerprint identification method, adopting the fingerprint identification element according to claim 1, wherein, the method comprises:

sequentially applying a scanning signal to the fingerprint identification scan lines, applying a preset voltage into the gate electrode and the source electrode of each first thin film transistor in the fingerprint identification units corresponding to each fingerprint identification scan line in the process of applying the scanning signal to each fingerprint identification scan line, and detecting a light current generated by each first thin film transistor and transmitted on each fingerprint identification read line;

determining a fingerprint pattern according to the detected light current;

comparing the determined fingerprint pattern with a pre-stored fingerprint information to determine whether the fingerprint pattern is the same with the pre-stored fingerprint information; and determining that a touch occurs in the case that it is determined that the fingerprint pattern is the same with the pre-stored fingerprint information.

6. A display device, comprising the fingerprint identification element according to claim 1.

7. The display device according to claim 6, further comprising: a plurality of pixel units arranged in matrix, wherein, each pixel unit comprises a plurality of sub pixel units of different colors, and in one column of the sub pixel units in each column of the pixel units, one fingerprint identification unit is arranged in each sub pixel unit.

8. The display device according to claim 7, wherein, the column of the sub pixel units arranged between two adjacent columns of the fingerprint identification units has a same number.

9. The display device according to claim 8, wherein, the color of the sub pixel unit corresponding to each fingerprint identification unit is blue.

10. The display device according to claim 7, wherein, the first thin film transistor and the second thin film transistor in each fingerprint identification unit are arranged in a stacking manner;

the fingerprint identification element further comprises a first insulating layer positioned between a layer in which the first thin film transistor is positioned and a layer in which the second thin film transistor is positioned;

each sub pixel unit comprises a pixel electrode and a third thin film transistor; and the first thin film transistor and the second thin film transistor in each fingerprint identification unit and the third thin film transistor in the sub pixel unit corresponding to each fingerprint identification unit are arranged in a stacking manner.

11. The display device according to claim 10, wherein, the third thin film transistor is positioned on a side of the second thin film transistor facing away from the first insulating layer, or the third thin film transistor is positioned between the layer in which the second thin film transistor is positioned and the first insulating layer; and the display device further comprises: a second insulating layer positioned between a layer in which the third thin film transistor is positioned and the layer in which the second thin film transistor is positioned.

12. The display device according to claim 6, wherein a plurality of adjacent fingerprint identification units are configured as one touch unit.

13. A display apparatus, comprising: the display device according to claim 6.

14. The fingerprint identification element according to claim 1, wherein, the gate electrode and the source electrode of the first thin film transistor in each fingerprint identification unit are applied with a preset voltage.

15. The fingerprint identification element according to claim 14, wherein, the preset voltage is a pulse voltage with a frequency consistent with the scanning signal.

16. The fingerprint identification method according to claim 5, wherein, the preset voltage is a pulse voltage with a frequency consistent with the scanning signal.

17. The display device according to claim 6, further comprising: a plurality of pixel units arranged in matrix, wherein, each pixel unit comprises a plurality of sub pixel units of different colors; and one fingerprint identification unit is arranged to correspond to each sub pixel unit.

18. The display device according to claim 6, further comprising: a plurality of pixel units arranged in matrix, wherein,
  each pixel unit comprises a plurality of sub pixel units of different colors; and
  one fingerprint identification unit is arranged to correspond to a plurality of pixel units.

\* \* \* \* \*